US009117059B2

(12) United States Patent
Atzkern et al.

(10) Patent No.: US 9,117,059 B2
(45) Date of Patent: Aug. 25, 2015

(54) METHODS FOR ADMINISTERING AN AUTONOMOUS RIGHTS COMPONENT, AUTONOMOUS RIGHTS ADMINISTRATION SYSTEMS AND DEVICES CARRYING OUT THE METHODS

(75) Inventors: Jürgen Atzkern, Münsterhausen (DE); Diana Filimon, Gersthofen (DE); Johannes Linne, Todtenweis (DE); Thilo Cestonaro, Augsburg (DE)

(73) Assignee: Fujitsu Technology Solutions Intellectual Property GmbH (DE)

( * ) Notice: Subject to any disclaimer, the term of this patent is extended or adjusted under 35 U.S.C. 154(b) by 370 days.

(21) Appl. No.: 13/471,566

(22) Filed: May 15, 2012

(65) Prior Publication Data
US 2012/0304314 A1   Nov. 29, 2012

(30) Foreign Application Priority Data
May 26, 2011   (DE) .......................... 10 2011 102 572

(51) Int. Cl.
*G06F 21/00* (2013.01)
*G06F 17/30* (2006.01)
*G06F 21/10* (2013.01)

(52) U.S. Cl.
CPC ..................................... *G06F 21/105* (2013.01)

(58) Field of Classification Search
USPC ........... 726/26–33; 713/189, 192–193
See application file for complete search history.

(56) References Cited

U.S. PATENT DOCUMENTS

| 5,552,776 | A | 9/1996 | Wade et al. | |
|---|---|---|---|---|
| 8,055,899 | B2* | 11/2011 | Levy et al. | 713/176 |
| 2006/0005261 | A1 | 1/2006 | Sukigara et al. | |
| 2008/0109323 | A1* | 5/2008 | Leach et al. | 705/26 |
| 2008/0140433 | A1* | 6/2008 | Levy et al. | 705/1 |
| 2009/0282432 | A1 | 11/2009 | Hahnefeld et al. | |
| 2011/0010562 | A1* | 1/2011 | Kill et al. | 713/189 |
| 2011/0030065 | A1* | 2/2011 | Kulakowski | 726/26 |
| 2012/0042173 | A1* | 2/2012 | Chou et al. | 713/189 |

FOREIGN PATENT DOCUMENTS

DE   10 2006 044 299      4/2008
EP          1 428 098 B1   6/2004

* cited by examiner

*Primary Examiner* — Amir Mehrmanesh
(74) *Attorney, Agent, or Firm* — DLA Piper LLP (US)

(57) ABSTRACT

A method for an autonomous rights administration component of a computer system includes recording devices of the computer system, determining unique identifiers for each recorded device, permanently storing the unique identifiers, defining a usage rights contingent and a usage rights requirement and activation of at least one application function on the basis of a comparison of the usage rights contingent with the usage rights requirement.

The invention furthermore relates to an autonomous rights administration system and a device for a rights administration of this type.

12 Claims, 4 Drawing Sheets

METHODS FOR ADMINISTERING AN AUTONOMOUS RIGHTS COMPONENT, AUTONOMOUS RIGHTS ADMINISTRATION SYSTEMS AND DEVICES CARRYING OUT THE METHODS

RELATED APPLICATION

This application claims priority of German Patent Application No. 10 2011 102 572.7, filed May 26, 2011, herein incorporated by reference.

TECHNICAL FIELD

This disclosure relates to a method for an autonomous rights administration component of a computer system. The disclosure furthermore relates to an autonomous rights administration system and a device suitable for carrying out the method.

BACKGROUND

Methods for rights administration components are essentially known. For example, methods are known in which a local rights administration component retrieves a license number or similar identifier of a customer and checks online in a database of the rights provider, for example, a software manufacturer, whether the customer has sufficient rights to use the software. The disadvantage of solutions of this type is that a data connection between the rights administration component and the database of the rights provider must exist for their implementation to enable activation of an application function.

In other approaches, usage rights are permanently linked to a given software component or hardware component, for example, through encryption on the basis of a unique device identifier. The disadvantage of approaches of this type is that a usage right, once it has been created, cannot be transferred, or can only be transferred with very substantial outlay, from one component to another.

It could therefore be helpful to provide a method and a rights administration component which operate autonomously, i.e., independently from a database of a rights provider, and simultaneously enable a particularly high flexibility in the administration and monitoring of usage rights.

SUMMARY

We provide a method for administering an autonomous rights component of a computer system including recording devices of the computer system connected to the rights component; determining at least one invariable, unique identifier for each recorded device; permanently storing each newly determined unique identifier in a first database; determining a usage rights contingent based on information stored in the first database; determining a usage rights requirement based on the information stored in the first database; comparing the usage rights contingent with the usage rights requirement; and activating at least one application function, if the determined usage rights contingent exceeds the determined usage rights requirement.

We also provide an autonomous rights administration system for a computer system including at least one autonomous rights administration component; at least one non-volatile mass memory that stores the first database; and at least one application software configured to check with the rights administration component whether the computer system is authorized to execute at least one application function before execution of the at least one application function; wherein the at least one autonomous rights administration component is configured to perform: recording devices of the computer system connected to the at least one rights administration component; determining at least one invariable, unique identifier for each recorded device; permanently storing each newly determined unique identifier in the first database; determining a usage rights contingent based on information stored in the first database; determining a usage rights requirement based on the information stored in the first database; comparing the usage rights contingent with the usage rights requirement; and authorizing execution of the least one application function if the determined usage rights contingent exceeds the determined usage rights requirement.

We further provide a device for use with an autonomous rights administration component of a computer system including at least one non-writable, non-volatile first memory, wherein a unique identifier for the device is stored in the first memory; and at least one write-once, non-volatile second memory, wherein a marker indicating whether the device has already been connected to at least one autonomous rights administration component is stored in the second memory.

We still further provide a non-transitory storage medium including program instructions that performs a method for an autonomous rights administration including recording devices of a computer system connected to a rights administration component; determining at least one invariable, unique identifier for each recorded device; permanently storing each newly determined unique identifier in a first database; determining a usage rights contingent based on information stored in the first database; determining a usage rights requirement based on the information stored in the first database; comparing the usage rights contingent with the usage rights requirement; and activating at least one application function if the determined usage rights contingent exceeds the determined usage rights requirement.

REFERENCE NUMBER LIST

1 Computer system
2 terminal device
3 unique identifier
4 Fuse
5 Data network
6 Server rack
7 Management blade
8 Blade server
9 Rights administration component
10 virtual computer unit
11 Mass memory
12 first database
13 second database
14 Application software
a Usage rights contingent b Usage rights requirement
e End date
s Start date

DETAILED DESCRIPTION

It will be appreciated that the following description is intended to refer to specific examples of structure selected for illustration in the drawings and is not intended to define or limit the disclosure, other than in the appended claims.

Our methods take into account not only standard predetermined usage rights allocated to a device of the computer system, but also, additionally, in particular, subsequently acquired usage rights.

The taking into account of different rights may be implemented as simply as possible and, in particular, with no need for manual input of information for each administered device. The re-use of existing usage rights in different rights administration components or computer systems is enabled.

We thus provide methods for an autonomous rights administration component of a computer system which may comprise the following steps:
  recording devices of the computer system connected to the rights administration component,
  determination of at least one invariable, unique identifier for each recorded device,
  permanent storage of each newly determined unique identifier in a first database with known devices,
  determination of a usage rights contingent based on the information stored in the first database,
  determination of a usage rights requirement based on the information stored in the first database,
  comparison of the usage rights contingent with the usage rights requirement, and
  activation of at least one application function if the determined usage rights contingent exceeds the determined usage rights requirement.

Determination and storage of unique device identifiers in a first, in particular local, database of the rights administration component allows for a secure recognition of whether and which devices are connected to the computer system or were connected to it in the past. Usage rights contingents allocated to the devices and a usage rights requirement required for their operation can be flexibly determined on the basis of this information.

Advantageously, the step of defining the usage rights requirement may comprise the following steps:
  determination of a first time of a first connection of a device to the rights administration component for each known device of the first database,
  determination of a second time of a last connection of a device to the rights administration component for each known device of the first database, wherein the second time corresponds to the current time if the device is currently connected to the rights administration component, and corresponds to the time of disconnection if the device has been disconnected from the rights administration component,
  definition of a usage period for each known device of the first database, based on the first time and the second time, and
  addition of all determined usage periods to define the usage rights requirement.

Through the aforementioned steps, a usage rights requirement can be determined according to the situation, in particular on the basis of actually recorded usage periods of a multiplicity of different devices.

Also, the step of defining the usage rights contingent may comprise multiplication of the number of unique identifiers stored in the first database by a predetermined usage period to determine the usage rights contingent.

An autonomous rights administration system for a computer system may comprise at least one autonomous rights administration component as described above, at least one non-volatile mass memory to store the first database and at least one application software which, before executing at least one intended application function, checks with the rights administration component whether the computer system is authorized to execute the application function.

A device for use in an autonomous rights administration component of a computer system may comprise at least one non-writable, non-volatile first memory and at least one write-once, non-volatile second memory, wherein a unique identifier for the device is stored in the first memory and a marker which indicates whether the device has already been connected to at least one autonomous rights administration component is stored in the second memory.

Due to the invariable storage of a unique identifier in conjunction with a marker in a write-once, non-volatile memory of a device, the repeated use of standard usage rights in different autonomous rights administration systems can be avoided.

Further advantages are described in the following detailed description of selected, representative examples.

Our methods are described in detail below on the basis of different examples, with reference to the drawings.

Figure 1:
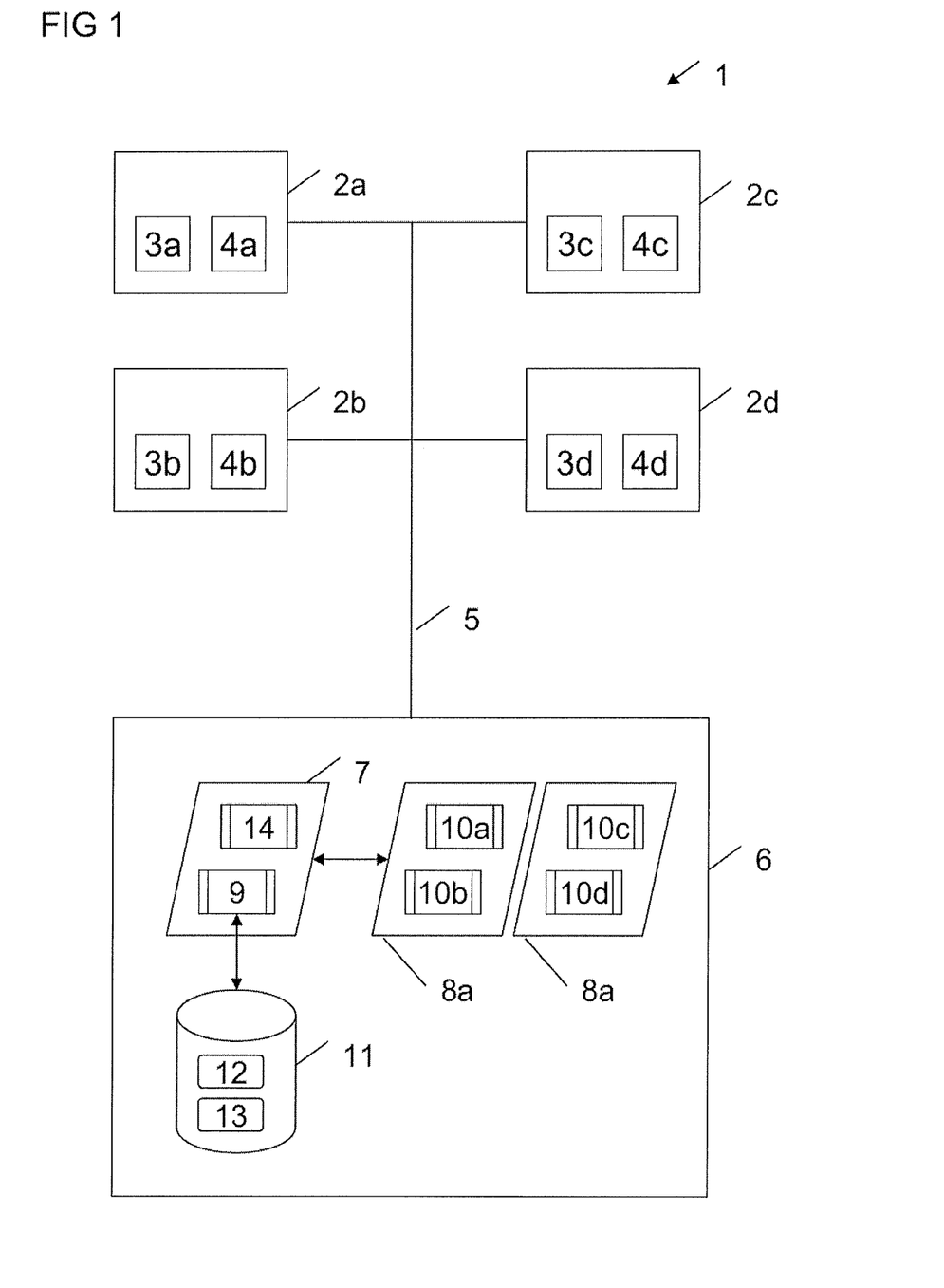
FIG. 1 shows a computer system with an autonomous rights administration system.

FIG. 1 shows an example of a computer system 1. In that example, the computer system 1 involves a combination of virtual and physical devices and software components.

In particular, the computer system 1 comprises a plurality of physical terminal devices 2a to 2d. Each of the terminal devices 2a to 2d has an invariable unique identifier 3a to 3d. The unique identifier 3 may, for example, be the MAC address of a network component, a serial number or other unique identifier of the terminal device 2 allocated by the manufacturer which is programmed in an invariable memory, for example, a ROM memory chip or a write-once WORM memory chip of the terminal device 2. The terminal device 2 additionally has one or more blowable fuses 4 (or fuse arrays) which indicate whether or not the terminal device was already connected in the past to a rights administration component. The meaning of the fuse 4 will be examined in detail later.

The terminal devices 2a to 2d are connected via a data network 5, for example, a corporate local network, to a server rack 6. The server rack 6 is, for example, a blade system, into which a plurality of blade computers which provide a required computer power can be inserted. The server rack 6 comprises, for example, a management blade 7 and two blade servers 8a and 8b. A rights administration component 9, inter alia, for the computer system 1 runs on the management blade 7. Computer power, inter alia, is provided by the blade servers 8a and 8b for four computer units 10a to 10d which are used by the terminal devices 2a to 2d to execute application programs.

The computer system 1 is a computer system with complete virtualization, in which end users access the virtual computer units 10 of the server rack 6 only by the relatively simple terminal devices 2, also referred to as "zero clients." The terminal devices 2a to 2d serve here merely to input and output data of the virtual computer units 10a to 10d, whereas the computer power for executing the actual application programs is provided by the blade servers 8 of the server rack 6.

Other architectures are also possible for the rights administration component 9 described here. For example, the terminal devices 2a to 2d may also be thin or fat clients of conventional client-server systems, or any other uniquely identifiable devices of a computer system.

The server rack 6 additionally comprises a mass memory 11 in which two databases 12 and 13 are stored. The mass memory 11 may, for example, comprise built-in memory drives of an individual blade computer, separate slot-in memory units of the server rack 6, or external mass memories such as, for example, an external RAID system. The first and second database 12 and 13 may comprise tables of a shared, relational database, separate databases or simple files with corresponding data entries stored in a file system of the mass memory 11.

Application software 14, which serves, for example, to administer the individual virtual computer units 10a to 10d, is executed on the management blade 7. The application software 14 serves, inter alia, to update the software of the virtual computer units 10. To perform this and other application functions, the application software 14 accesses the rights administration component 9 to check whether a function requested in each case by a user, for example, a system administrator, is covered by the currently available usage rights.

The individual usage rights are normally bought separately by the customer. The customer has, for example, the option of purchasing a certain usage rights contingent, for example, the application software 14 to update 100 virtual computer units 10 for a one-year period. However, a contingent of this type can also be used to update 200 virtual computer units 10 for a six-month period. This causes the usage rights to apply over the entire period despite variable use.

Additionally, the rights administration component 9 may take account of the fact that that each device of the computer system 1 is already equipped on delivery with predetermined usage rights. For example, each terminal device 2a to 2d may be provided with a cost-free usage right to update a virtual computer unit 10 for a one-year period. Other components of the computer system 1, for example, the application software 14 or the blade servers 8a and 8b, can be equipped in an equivalent manner with their own usage rights which are similarly to be taken into account by the rights administration component 9 in defining the rights contingent. To be able to meet these and other requirements in a flexible manner, a method for the rights administration component 9 is described below with reference to FIG. 2.

Figure 2:
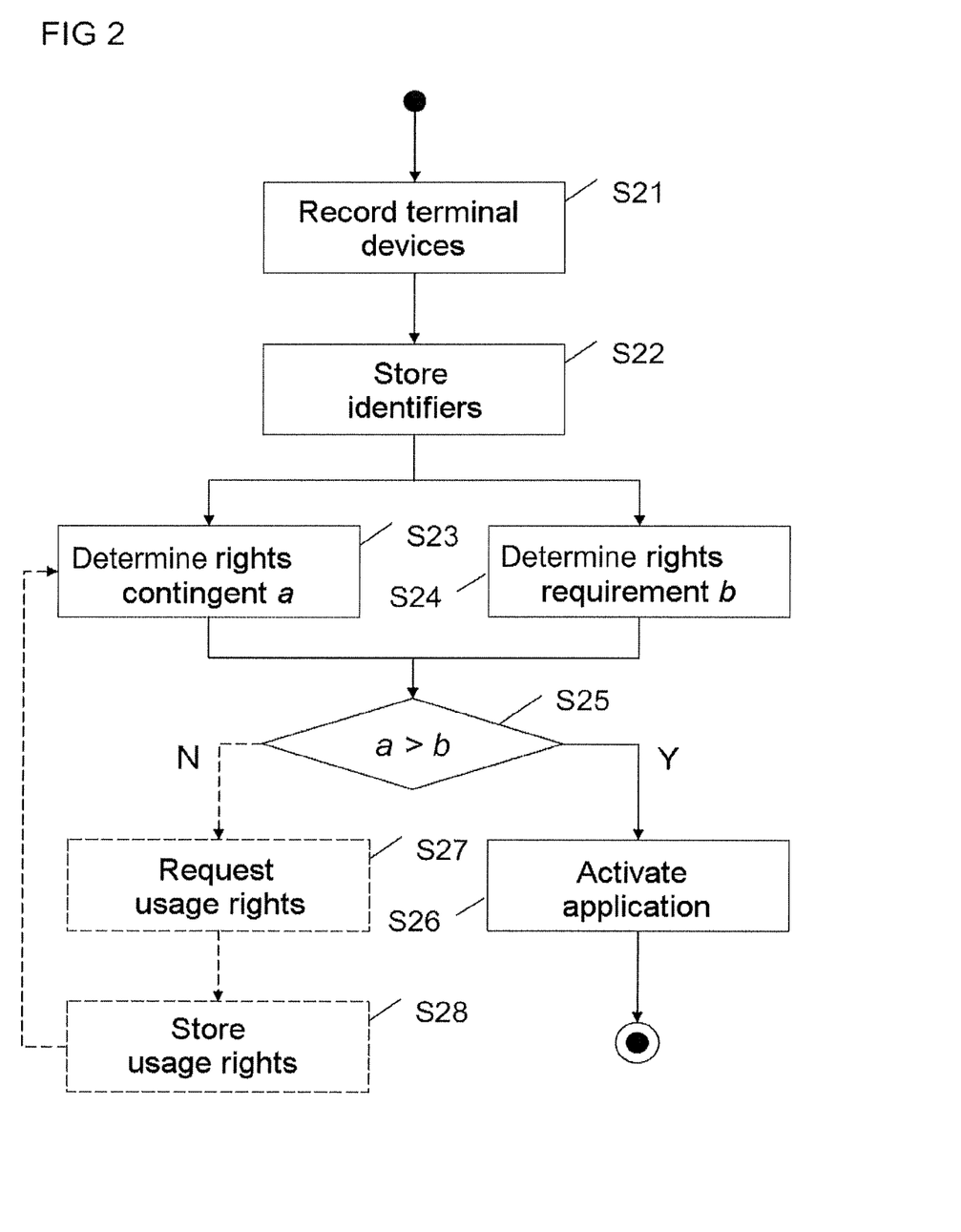
FIG. 2 shows a flow diagram of a method for an autonomous rights administration component.

In a first step S21, devices of the computer system 1 administered by the rights administration component 9 are recorded. All terminal devices 2a to 2d of the computer system 1, for example, are recorded by the rights administration component 9. The rights administration component 9 records in particular the unique identifiers 3a to 3d of the terminal devices 2a to 2d.

In a further step S22, the recorded unique identifiers 3a to 3d are stored in the first database 12. A time of a first and, where appropriate, a time of a last use of the terminal device 2a to 2d are stored in the first database 12 in addition to the unique identifier. If the rights administration component 9 records an identifier 3a of a terminal device 2a, it first checks for this purpose whether the recorded identifier 3a is already contained in the first database 12. If so, no further changes are made to the first database 12. On the other hand, if the unique identifier 3a is not yet contained in the first database 12, a new data record, containing both the unique identifier of the recognized terminal device 2a and a current date as the time of the first connection, is created in the first database 12. As the time of the last connection, either no date or a date in the distant future is recorded to indicate that the associated terminal device 2a is still connected to the computer system 1 and therefore to the rights administration component 9.

In a following step S23, the size of a contingent a of existing usage rights is determined. Not only the existing usage rights linked to individual devices of the computer system 1, but also usage rights acquired separately by the customer are taken into account for this purpose. It is also possible for only one of the two types of usage rights to be taken into account.

Use is again made of the first database 12 for the existing standard usage rights. For example, it is possible to enquire from the first database 12 how many terminal devices 2a to 2d are connected in each case to the rights administration component 9. If it is assumed that a one-year cost-free usage period is allocated to each terminal device 2a to 2d, a usage rights contingent of four device years, for example, results in the case of the connection of four terminal devices.

The second database 13 is consulted to take into account further usage rights additionally acquired by the customer. The second database 13 may, for example, contain unique identifiers allocated in each case to a predetermined usage period, for example, one device year. If the second database 13 contains fifteen unique identifiers, this then corresponds to a further usage rights contingent of fifteen device years. Alternatively, a usage period can also be explicitly stored in the second database 13 for each identifier. For example, an individual identifier with a usage period of fifteen device years can be stored in the second database 13. The unique identifiers may, for example, be provided via a data medium or an electronic message, for example, an e-mail message or an electronic XML message of a web service. A repeated use of the associated usage rights is prevented via the requirement for the uniqueness of the identifiers in the second database 13. Alternatively or additionally, a repeated use can also be prevented by coding the electronic message or the identifiers contained therein with an expiry date, for example, three months following generation of the identifiers by the rights holder.

In a further step S24, which can be carried out in parallel with step S23 or independently therefrom before or after it, the usage rights requirement b is determined for the computer system 1. The usage rights requirement may be determined on the basis of the actual connection times of each terminal device 2 known to the rights administration component 9. For this purpose, it is determined on the basis of the entries of the first database 12 when a terminal device 2 was connected for the first time to the data network 5 and was identified by the rights administration component 9. If a terminal device 2 has been removed in the meantime from the computer system 1, the usage period is additionally determined on the basis of the end date, which is likewise stored in the first database 12. Otherwise, the usage period is determined as the period between the date of the first connection and the current date.

In a following step S25, the usage rights contingent a determined in step S23 is subtracted from the usage rights requirement b determined in step S24. If this results in a positive usage rights balance, the application software 14 can execute an application function requested by a user, such as, for example, updating of the virtual computer units 10a to 10d. Activation by the rights administration component 9 is carried out in step S26 for this purpose.

Otherwise, i.e., if a negative usage rights balance occurs in step S25, a user of the computer system 1 is requested to acquire new usage rights in step S27. If the user, for example, the administrator of the computer system 1 responds to this request, the administrator can load the new usage rights obtained from the holder of the usage rights via a data medium or a different suitable form onto the computer system 1.

The rights administration component 9 then checks the uniqueness of the unique identifiers provided and stores them in step S28 in the second database 13. Alternatively or additionally, matching of parts of the identifier with a unique identifier of the computer system 1 can be checked during importation of identifiers. It is possible, for example, for the rights holder to encode the identifiers provided using a MAC address of the management blade 7 designated by the customer to prevent use in a different computer system.

Figure 3:
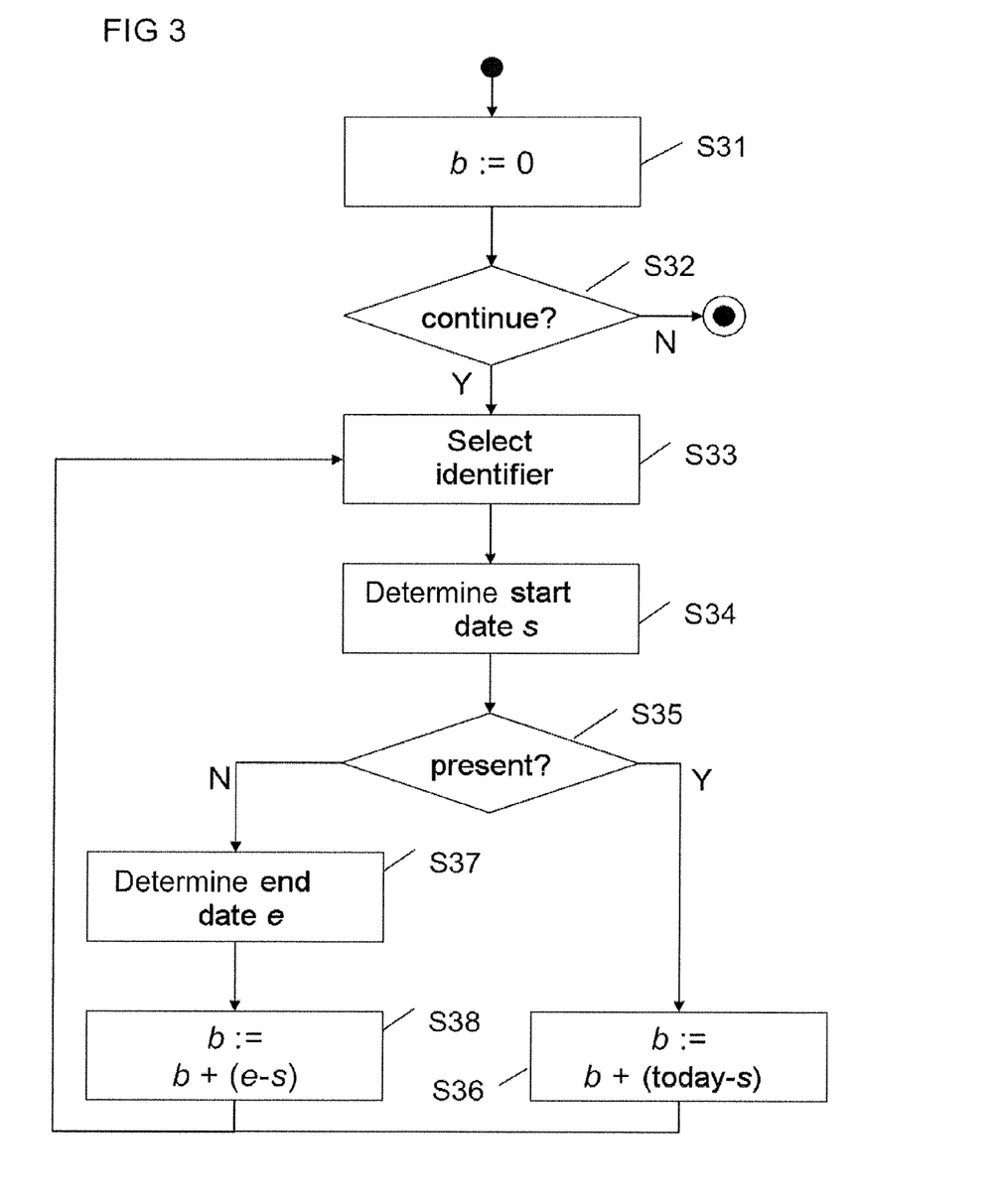
FIG. 3 shows a flow diagram of a method for defining a usage rights requirement.

FIG. 3 shows a flow diagram of an example of a method for defining a usage rights requirement.

In a first step S31, the necessary usage rights requirement b is set to a fixed value, in particular to zero.

In a following step S32, a check is carried out to ascertain whether further entries which must be taken into account in defining the usage rights requirement b are present in the first database 12. If so, i.e., if the first database 12 is not completely empty, a first unique identifier 3a is selected in a following step S33. In a following step S34, the date s of the first connection of the terminal device 2a to the rights administration component 9 is determined for the terminal device 2a assigned to the unique identifier 3a. The date of the first connection is stored jointly with the unique identifier 3a in the first database 12.

In a following step S35, a check is carried out to ascertain whether the associated terminal device 2a is still connected to the rights administration component 9. If so, the rights requirement for the terminal device 2a is determined in step S36 by subtracting the stored first date from the current date. This produces, for example, a usage period in days. The calculated usage period is then added to the previously determined usage rights requirement b.

If, on the other hand, it is determined in step S35 that the terminal device 2a is no longer connected to the computer system 1, the end date stored in the first database 12 is retrieved therefrom in step S37. If no end date e is yet stored at this time in the first database 12, the current date is stored as the end date e. The usage rights requirement for the terminal device 2a which has now been excluded is obtained in this case in step S38 as the difference between the stored end date e and the stored start date s of the first database 12. As in step S36, the calculated usage period is then added to the total usage rights requirement b.

A check is then carried out in step S32 to ascertain whether further terminal devices 2 must be taken into account in the method. This is done, for example, by retrieving all identifiers 3 stored in the first database 12. If so, the next unique identifier 3b is selected from the first database 12 in step S33 and processed as described above. Otherwise the method ends.

Figure 4:
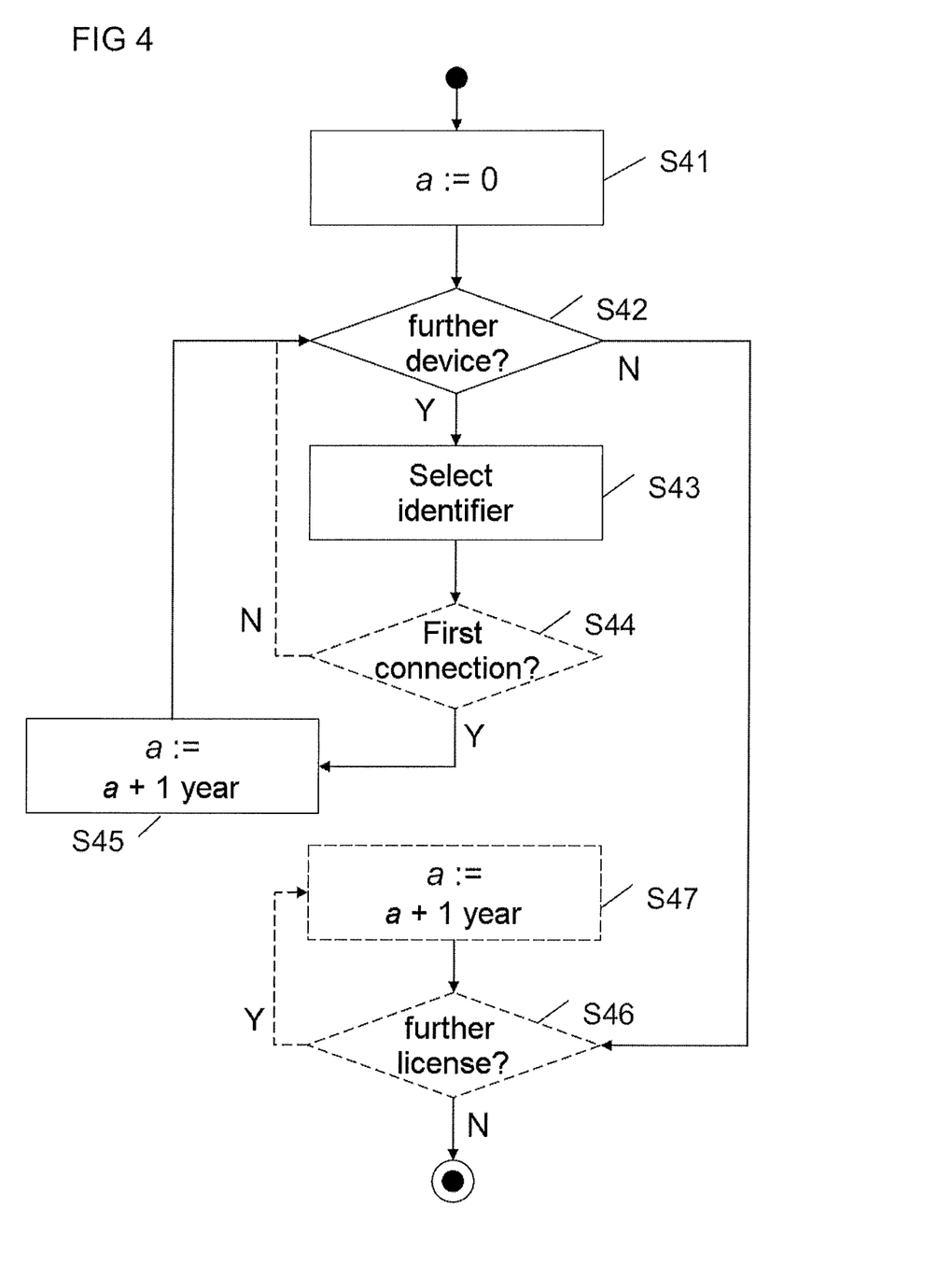
FIG. 4 shows a flow diagram of a method for defining a usage rights contingent.

FIG. 4 shows a flow diagram of an example of a method for defining available usage rights contingents a.

In a first step S41, a basic contingent is determined. For example, the available rights contingent a is set to a fixed value such as, in particular, zero.

In a following step S42, a check is carried out to ascertain whether further terminal devices 2 administered by the rights administration component 9, are contained in the computer system 1. The check can be carried out either on the basis of polling the actual terminal devices 2 or, as in the example described below, on the basis of the recorded identifiers 3 in the first database 12. If a further unique identifier 3 is found, the next terminal device allocated to the selected identifier 3, for example, the terminal device 2a, is selected in step S43.

If it is assumed that a re-use of terminal devices 2 in different computer systems 1 with different rights administration components 9 is unlikely, the usage rights contingent a can be determined in a particularly simple manner by multiplying all identifiers 3 contained in the first database 12 by a standard usage period. This assumption is justified, for example, if the transport of a terminal device 2 from one company site to another company site of the customer represents a relatively high cost compared with the value of the usage rights allocated to it.

If not, or if a misuse is to be excluded under all circumstances, a check can be carried out in an optional step S44 to ascertain whether the terminal device 2a was already previously connected to a different rights administration component 9. Each terminal device 2a to 2d has a blowable fuse 4 for this purpose which, on the first retrieval and storage of the unique identifier of the device 3a in step S22, is blown by the rights administration component 9. To indicate that the usage rights contingent allocated to the terminal device 2a has been transferred to the computer system 1, a corresponding marker for the associated identifier 13 is also stored in the first database 12. A link or transfer of the usage rights to the computer system 1 is produced in this way.

Alternatively, the fuse 4 can also be blown by the terminal device 2 itself, for example, when the first successful connection is made to the management blade 7. It is also possible to blow the fuse 4 during manufacture, for example, to identify devices for a specific destination country which are sold without linked usage rights.

If a marker of this type is contained in the first database 12, or if the fuse 4 is still intact, any contingent usage rights allocated to the terminal device 2a is added in step S45 to the contingent a to be determined. The method is then continued in step S42, and a check is carried out to ascertain whether further terminal devices 2b to 2d are still contained in the computer system 1.

If, on the other hand, it was established in step S44 that the terminal device 2a has already been previously used in a different computer system 1, for example, because the fuse 4 is already blown and no marker is contained in the first database 12, the associated terminal device 2a contributes no further rights contingent to the rights contingent to be determined, and the method is immediately continued with step S42.

If all terminal devices 2 have been polled, a check is carried out in a following, optional step S46 to ascertain whether further unique identifiers are contained in the second database 13. If so, the determined rights contingent is increased in a following step S47 by the number of usage rights linked to the unique identifier. For example, the determined contingent is increased by a fixed value such as, for example, one device year, or by an additional value, which is likewise stored in the second database 13. The method is then continued in step S46 to check whether further identifiers, which must be taken into account for defining the usage rights contingent, are still present in the second database 13. If not, the method ends.

In a further design, the rights administration component 9 is furthermore set up to export existing usage rights contingents. For example, a system administrator can export remaining usage rights from a computer system 1, before the computer system 1 is removed from a company. For this purpose, the rights administration component 9 checks the surplus of the existing usage rights contingent a compared with the consumed usage rights requirement b. If this results in a positive usage rights balance, the rights administration component 9 can, for example, create a data medium with unique identifiers to which corresponding usage rights are allocated. If the rights administration component 9 or the computer system 1 from which the usage rights are exported is further used, the exported usage rights are preferably stored in the second database 13 as negative usage rights. To guarantee the uniqueness of the created identifiers, the rights administration component may, for example, take a unique identifier of the rights administration system, such as, for example, the MAC address of the management blade 7, into account in the creation thereof. The dependence on the unique identifier may simultaneously indicate that the usage rights involved are negative usage rights, i.e., usage rights to be subtracted from a local usage rights contingent a, are involved.

The described systems and methods thus allow implementation of a simply structured and simultaneously flexibly operating, autonomous rights administration system. The rights administration systems are suitable in particular for taking account of not only usage rights allocated to standard existing, individual devices, but also separately acquired, device-independent usage rights. The existing usage rights can be distributed flexibly over a plurality of different devices of a computer system 1 and can be used therein. To do this, the rights administration component 9 requires, in particular, no access to a central server of a usage rights provider.

The methods described with reference to FIGS. 2, 3 and 4 can of course also be used to operate the autonomous rights administration systems, to define usage rights requirements and a usage rights contingent independently from one another and independently from the autonomous rights administration systems described here.

For example, the methods for defining a usage rights requirement and a usage rights contingent are also suitable for use in rights administration systems, known per se, with a central usage rights database.

The described device with a write-once memory is also suitable for storing other device-specific service data, independently from the other devices and methods described here. For example, the date of the first commissioning of a device from the BIOS of the device during the first connection to a server computer can be stored for the purpose of defining a warranty period.

Although the methods and devices have been described in connection with specific forms thereof, it will be appreciated that a wide variety of equivalents may be substituted for the specified elements described herein without departing from the spirit and scope of this disclosure as described in the appended claims.

The invention claimed is:

1. A method of administering an autonomous rights component of a computer system, comprising:
   recording devices of the computer system connected to the rights component by determining at least one invariable, unique identifier for each device that is being recorded;
   permanently storing each newly determined unique identifier in a first database;
   determining a usage rights contingent based on information stored in the first database;
   determining a usage rights requirement based on information stored in the first database;
   comparing the usage rights contingent with the usage rights requirement;
   activating at least one application function, if the determined usage rights contingent exceeds the determined usage rights requirement;
   requesting further usage rights, if the determined usage rights requirement exceeds the determined usage rights contingent; and
   permanently storing unique identifiers of provided further usage rights in a second database with known usage rights,
   wherein, in the step of determining the usage rights contingent, the usage rights contingent is determined on a basis of the unique identifiers stored in the first database and unique identifiers stored in the second database.

2. The method according to claim 1, further comprising requesting a surplus contingent; checking whether the determined usage rights contingent exceeds the determined usage rights requirement by the surplus contingent; exporting at least one unique identifier to which the surplus contingent of usage rights is allocated if the check is positive; and permanently storing the exported unique identifier in the second database as negative usage rights.

3. The method according to claim 1, wherein defining the usage rights requirement comprises defining a first time of a first connection of a device to the rights administration component for each known device of the first database, defining a second time of a last connection of a device to the rights administration component for each known device of the first database, wherein the second time corresponds to actual time if the device is currently connected to the rights administration component, and corresponds to time of disconnection if the device has been disconnected from the rights administration component, defining a usage period for each known device of the first database based on the first time and the second time; and addition of all determined usage periods to define the usage rights requirement.

4. The method according to claim 1, wherein defining the usage rights contingent comprises multiplying the number of unique identifiers stored in the first database by a predetermined usage period to define the usage rights contingent.

5. The method according to claim 4, wherein a marker allocated to the unique identifier of a device indicating whether the respective device has been connected for the first time to a rights administration component is additionally permanently stored; and in the step of multiplying the number of unique identifiers stored in the first database, only the number of those identifiers whose marker is set is taken into account.

6. An autonomous rights administration system for a computer system comprising at least one autonomous rights administration component; at least one non-volatile mass memory that stores the first database; and at least one application software configured to check with the rights administration component whether the computer system is authorized to execute at least one application function before execution of the at least one application function; wherein the at least one autonomous rights administration component is configured: recording devices of the computer system connected to the at least one rights administration component; determining at least one invariable, unique identifier for each recorded device; permanently storing each newly determined unique identifier in the first database; determining a usage rights contingent based on information stored in the first database; determining a usage rights requirement based on the information stored in the first database; comparing the usage rights contingent with the usage rights requirement; authorizing execution of the at least one application function if the determined usage rights contingent exceeds the determined usage rights requirement; requesting further usage rights if the determined usage rights requirement exceeds the determined usage rights contingent; and permanently storing unique identifiers of provided further usage rights in a second database with known usage rights, wherein, in determining the usage rights contingent, the usage rights contingent is determined on a basis of the unique identifiers stored in the first database and unique identifiers stored in the second database.

7. The system according to claim 6, wherein at least one of the following entries is additionally stored in the first database for each unique identifier: a time of a first connection of an allocated device, a time of a first disconnection of the allocated device, a marker indicating whether the allocated device has been connected for the first time to the rights administration component, a version identifier of an allocated device or a country code of an allocated device.

8. The system according to claim 6, further comprising the second database with known usage rights.

9. The system according to claim 6, further comprising a time device, wherein the at least one autonomous rights administration component is also configured to perform:
- determining a first time of a first connection of a device to the rights administration component for each known device of the first database,
- determining a second time of a last connection of a device to the rights administration component for each known device of the first database, wherein the second time corresponds to actual time provided by the time device if the device is currently connected to the rights administration component, and corresponds to time of disconnection if the device has been disconnected from the rights administration component,
- determining a usage period for each known device of the first database based on the first time and the second time; and
- adding all determined usage periods to define the usage rights requirement.

10. The system according to claim 6, wherein the at least one autonomous rights administration component is also configured to perform multiplication of the number of unique identifiers stored in the first database by a predetermined usage period to define the usage rights contingent.

11. The system according to claim 10, further comprising at least one device comprising a fuse for permanently storing a marker indicating whether the respective device has been connected for the first time to a rights administration component, wherein the at least one autonomous rights administration component is also configured to perform:
- in multiplying the number of unique identifiers stored in the first database, only the number of those identifiers whose marker is set is taken into account.

12. A non-transitory storage medium comprising program instructions that performs a method for an autonomous rights administration comprising:
- recording devices of a computer system connected to a rights administration component;
- determining at least one invariable, unique identifier for each recorded device;
- permanently storing each newly determined unique identifier in a first database;
- determining a usage rights contingent based on information stored in the first database;
- determining a usage rights requirement based on the information stored in the first database;
- comparing the usage rights contingent with the usage rights requirement;
- activating at least one application function if the determined usage rights contingent exceeds the determined usage rights requirement;
- requesting further usage rights, if the determined usage rights requirement exceeds the determined usage rights contingent; and
- permanently storing unique identifiers of provided further usage rights in a second database with known usage rights, wherein, in the step of determining the usage rights contingent, the usage rights contingent is determined on a basis of the unique identifiers stored in the first database and unique identifiers stored in the second database.

\* \* \* \* \*